Sept. 1, 1970  J. J. WELLER  3,526,050

EMBLEMATIC ARTICLE OR MEDALLION

Filed May 22, 1968  3 Sheets-Sheet 1

INVENTOR.
JOHN J. WELLER

BY
Hopgood & Calimafde
ATTORNEYS

United States Patent Office 3,526,050
Patented Sept. 1, 1970

3,526,050
EMBLEMATIC ARTICLE OR MEDALLION
John J. Weller, Emmaus, Pa., assignor, by mesne assignments, to Standard Plastics, Inc., a corporation of Pennsylvania
Filed May 22, 1968, Ser. No. 731,138
Int. Cl. G09f 7/00
U.S. Cl. 40—129                                                5 Claims

ABSTRACT OF THE DISCLOSURE

An emblematic article or medallion is provided for use with an automobile radio antenna. The medallion is preferably made of foam plastic and has a substantially flat geometric configuration with front and back faces of substantially the same area, the medallion also having a leading and a trailing edge and an aperture for receiving a supporting member therein, e.g. the end of a radio antenna, the aperture extending into the cross-sectional thickness of the medallion from one edge thereof. The aperture in elevation is disposed intermediate the leading edge and the vertical axis of the center of gravity, the distance from the axis of center of gravity being advantageously about 10 to 35% of the effective width of the medallion determined by dividing the area of one face of the medallion by its height.

---

This invention relates to an emblematic article or medallion having indicia thereon and, in particular, to a medallion adapted for being supporting by a radio antenna of a moving vehicle.

It is common to use automobile antennae for supporting pennants, small flags, banners or other emblematic articles. Automobile antennae which are usually telescopically disposed in the vertical position are extremely flexible and are subject to bending moments during the motion of a vehicle, particularly when carrying flag-like pennants or banners which undulate or wave vigorously due to cross winds and wind deflection effects arising from the reaction of a breeze with the windshield or other portions of a moving vehicle. Banners carrying information such as "Drink Florida Orange Juice" or "Vote For Smith" are not always readable when a car is in motion, due to cross wind effects of deflected slip streams, and the like, on the supported flags or banners.

It would be desirable to provide a lightweight substantially rigid emblematic article or medallion for support by a radio antenna and which is capable of weather vaning itself in a substantially stable position with minimum wiggling without causing undue bending of the antenna so that the information on the medallion can be read by bystanders while the car is in motion. Emblematic medallions, especially those made from low density foam plastic, would have particular utility for advertising goods, or for puffing political candidates or company trademarks.

It is thus the object of this invention to provide a medallion for use with a radio antenna of moving vehicles.

Another object is to provide a medallion made of low density material, such as foam plastic, adapted for use with a vehicular radio antenna.

These and other objects will more clearly appear when taken in conjunction with the following disclosure and the accompanying drawings, wherein.

Stating it broadly, the invention provides a substantially flat geometrically configured medallion having a front and back face of substantially the same area and leading and trailing edges. The medallion is provided with an aperture, blind hole, or recess for receiving a supporting member, such as the free end of a vehicular radio antenna, the aperture extending into the cross-sectional thickness of the medallion from one edge thereof, the longitudinal axis of the aperture in elevation being disposed intermediate the leading edge and the vertical axis of the center of gravity of the medallion. In order to inhibit as much as possible the wiggling of the medallion arising from a weather vaning effect during motion of the vehicle, it is advantageous to locate the aperture at a distance from the axis of the center of gravity corresponding to about 10% to 35% of the effective width of the medallion, the effective width being determined by dividing the area of one face of the medallion by its height.

Figure 1:
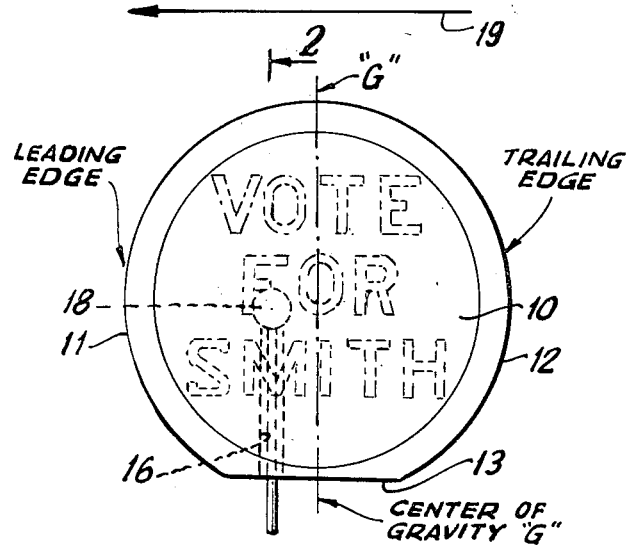
FIGS. 1 and 2 are illustrative of one embodiment of a substantially flat medallion of foam plastic for use with an automobile antenna, FIG. 2 being a cross section taken along line 2—2 of FIG. 1.
Figure 2:
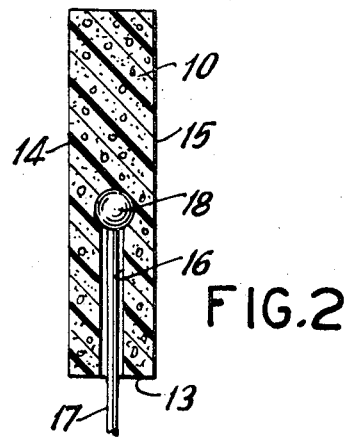

Referring to FIGS. 1 and 2, one embodiment of a medallion 10 provided by invention is shown having a leading edge 11, a trailing edge 12 and a flat edge 13 at its bottom, the medallion being substantially circular in geometry. The axis of the center of gravity of the medallion is designated by the letter "G." The medallion is substantially flat as shown in FIG. 2 and has a front face 14 and a back face 15.

Intermediate leading edge 11 and axis "G," an aperture, blind hole or recess 16 is provided extending into the cross-sectional thickness of the medallion (note FIG. 2) from edge 13, the longitudinal axis of the aperture in elevation being located between front and back faces 14 and 15 (FIG. 2). Referring to FIG. 1, it will be noted that a radio antenna 17 extends into the aperture of the medallion, the antenna in this instance having a spherical terminus 18 slightly larger than the diameter of the aperture. By employing foam plastic in the construction of the medallion, the top of the antenna can be pushed into the aperture since the foam plastic is sufficiently yieldable and resilient to allow the spherical terminus to be press-fitted and locked in at the blind end of the aperture. This is desirable in order to inhibit the medallion from being lifted aerodynamically from the antenna during motion of a vehicle. A low density foam plastic is desirable in that it is sufficiently rigid to retain its shape and also does not apply strain to extremely flexible antennae. Of course, other materials can be used for the purpose, such as balsa wood, compressed fibrous materials, low density metals and the like. In the embodiment shown in FIG. 1, the medallion may be about 2¾ inches in diameter or larger and about one-half to five-eighths of an inch thick or larger.

As stated hereinabove, it is advantageous to insure proper weather vaning to support the medallion (note FIG. 1) intermediate leading edge 11 and axis "G" at a prescribed distance from the axis. Thus, as the supported medallion is moved in the direction of arrow 19, the medallion will weather vane itself properly and maintain its weather vane position with minimum wiggling. As has been stated, the distance from axis "G" should advantageously range from about 10% to 35% of the effective width of the geometry of the medallion, the effective width being determined by dividing the area of one face as viewed in elevation by its height. This will be clearly apparent by referring to FIGS. 3 to 6 which are representatives of a circle, a triangle, a square and a rectangle, respectively.

Figure 3:
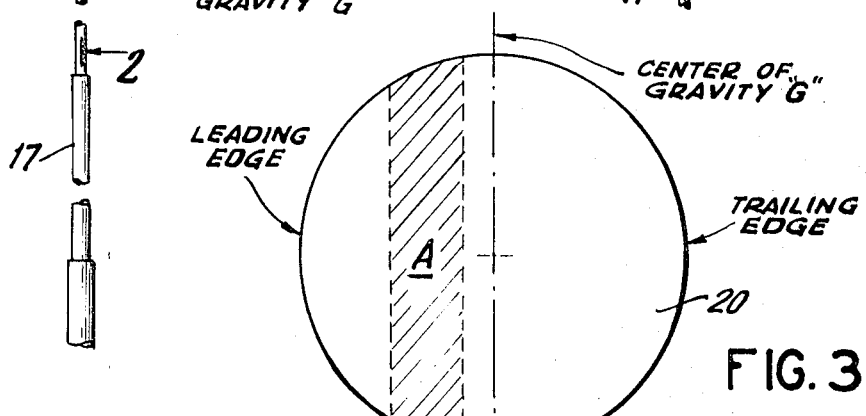
FIGS. 3 to 7 depict various embodiments of medallions of different geometric configurations.

Referring first to FIG. 3, the effective horizontal width E.W., is as follows:

(1)
$$E.W. = \frac{\pi R^2}{2R} = \frac{\pi R}{2}$$

where 2R=height of the medallion.

The aperture 16 of FIG. 1 would be located at a distance from axis "G" of about 10% to 35% of E.W. Assuming the circle 20 of FIG. 3 to have a diameter of 2¾ inches, then the effective width will be about 2.17 inches and the distance of the aperture from the axis will range from about 0.22 inch to 0.76 inch as illustrated by shaded area A.

Figure 4:
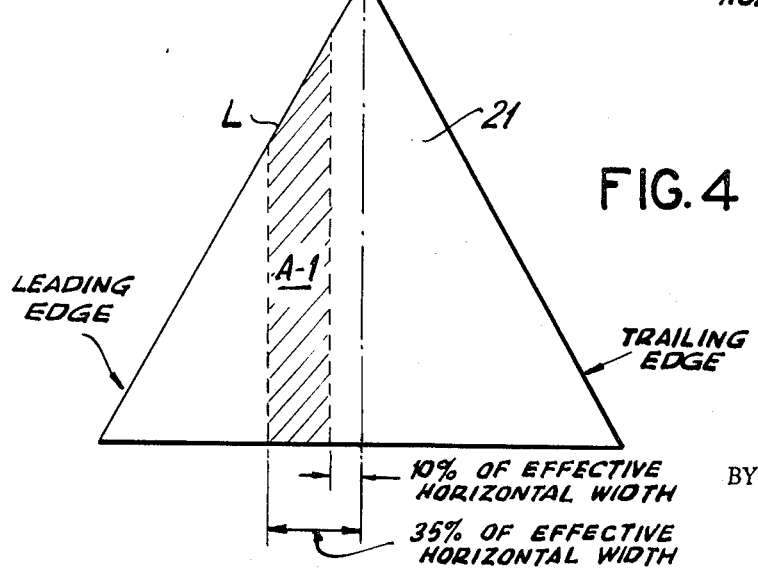

In FIG. 4, an equilateral triangle 21 of the same area as the circle of FIG. 3 is shown, the legs "L" having a length of about 3.7 inches. The effective horizontal width of the triangle is determined as follows:

(2)
$$E.W. = \frac{\text{Area}}{\text{Height}} = \frac{\left(\frac{L}{2}\right)\left(\frac{\sqrt{3}}{2}L\right)}{\left(\frac{\sqrt{3}}{2}L\right)} = \frac{L}{2}$$

$$E.W. \frac{3.7}{2} = 1.85 \text{ inches}$$

Since the aperature is preferably located from the axis at 10% to 35% of the effective width, it will range from about 0.185 inch to 0.65 inch as illustrated by shaded area A–1.

Figures 5, 6:
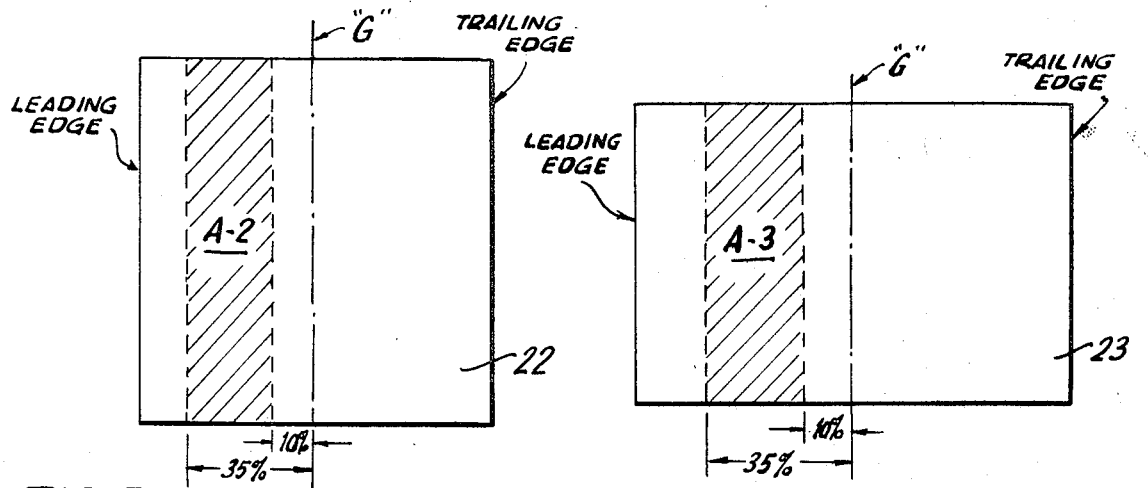

Referring now to FIG. 5, a square 22 is shown having the same area as the geometric configuration of FIGS. 3 and 4, the length of the side of the square being about 2.45 inches and its thickness about one-half inch. The location of the aperture will fall in shaded area A–2 and will range in distance from the axis "G" at about 0.245 inch to 0.86 inch.

A rectangle 23 is shown of the same area of FIGS. 3 to 5, the width of the rectangle being about 3 inches and the height about 2 inches. The effective width calculates to 3 inches. The distance of the aperture from axis "G" may range from about 0.3 inch to about 1.05 inch as shown by shaded area A–3. A medallion of this shape may be one-half inch thick.

Figure 7:
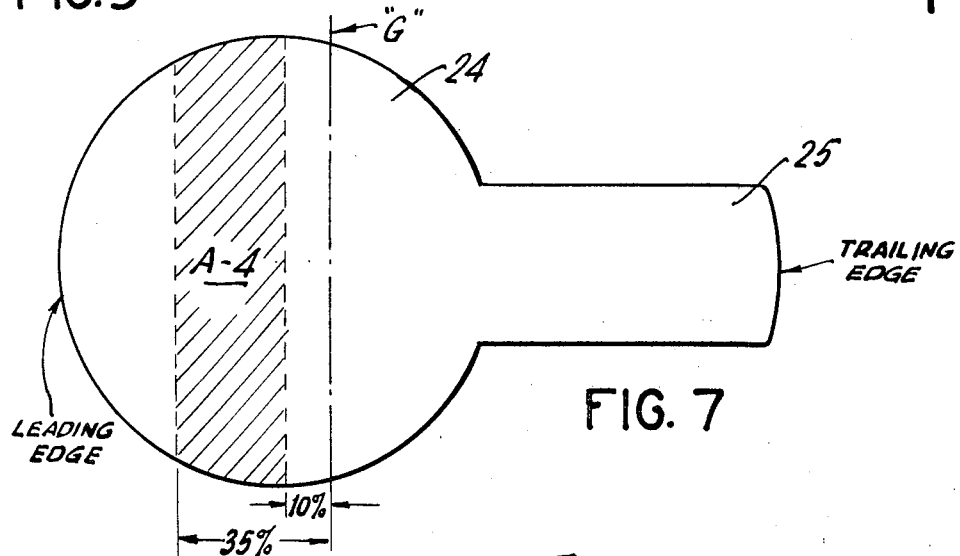

In FIG. 7, a medallion is shown of geometric configuration formed of a circular portion 24 and a rectangular tail portion. The total area is the sum of the two portions, the diameter of the circular portion wihch is 3 inches being the height of the configuration, the extending rectangular portion being about 2 inches long and about one and one-eighth inch wide, the medallion being about one-half inch thick. As will be noted, the axis of center of gravity "G" is to the right of the center of the circle. The effective width of the medallion is about 3.07 inches. The distance of the aperture from axis "G" will range from about 0.31 inch to 1.1 inches as shown by shaded area A–4. An advantage of this configuration is that more space is provided for informational material.

A preferred distance of the aperture from axes "G" shown in FIGS. 3 to 7 is approximately 22% of the effective horizontal width of the medallion.

As has been stated hereinbefore, the medallion provided by the invention may be advantageously produced from foam plastic, the methods being well-known. A preferred method is to use expansible polystyrene beads which are fed into a mold to which heat is applied via steam jackets to expand the polystyrene beads.

Figure 8:
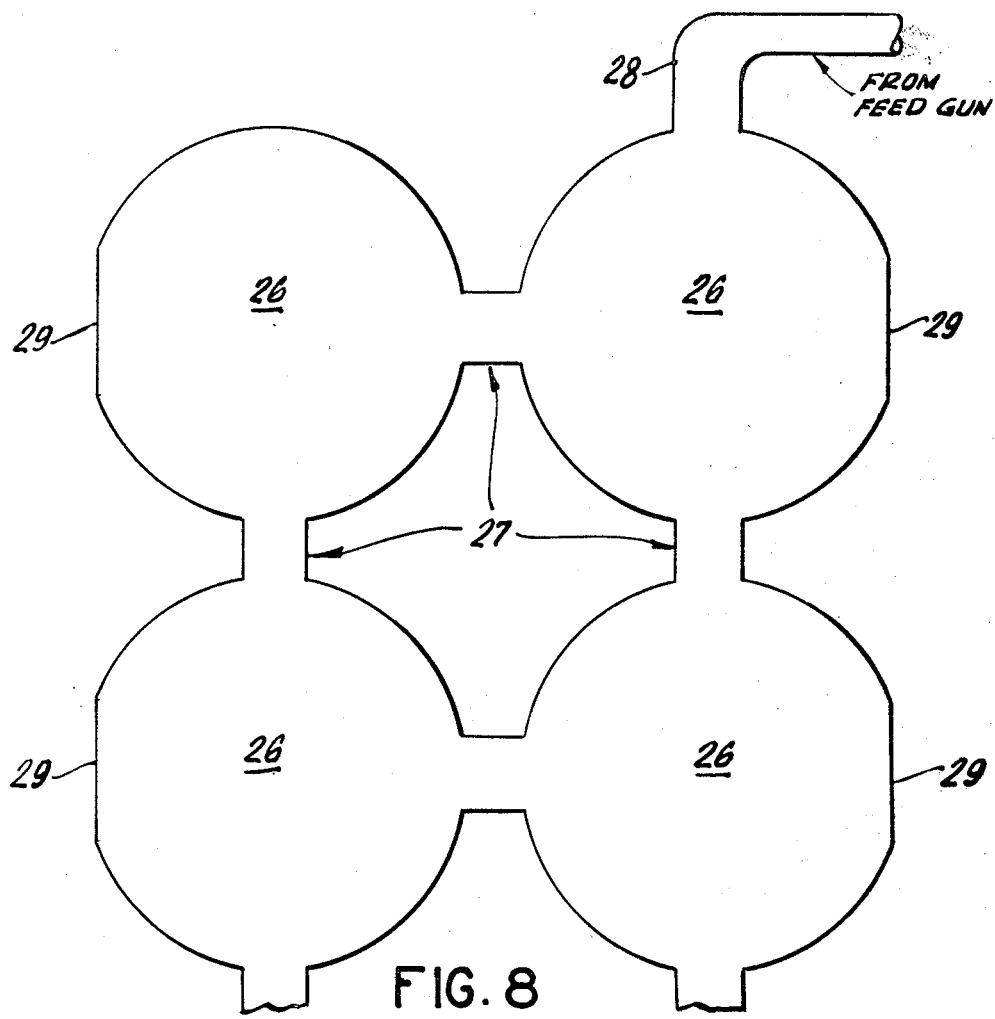
FIG. 8 is a schematic illustration of a segment of a plurality of molded medallions interconnected by gates as produced from foam plastic, such as expanded polystyrene beads, in a multi-segmented mold.

A multicompartmented mold is preferably employed to produce a plurality of medallions connected together via gates which are thereafter severed to separate the medallions. A segment of gang molded medallions is shown schematically in FIG. 8. The medallions 26 are joined or connected by gates 27, the main gate 28 being derived from the feed gun from which the polystyrene beads are fed. As will be noted, the circular medallions are provided by flats 29 which serve as indexing means into which the apertures or blind holes are formed as will be apparent from FIG. 10.

Figure 9:
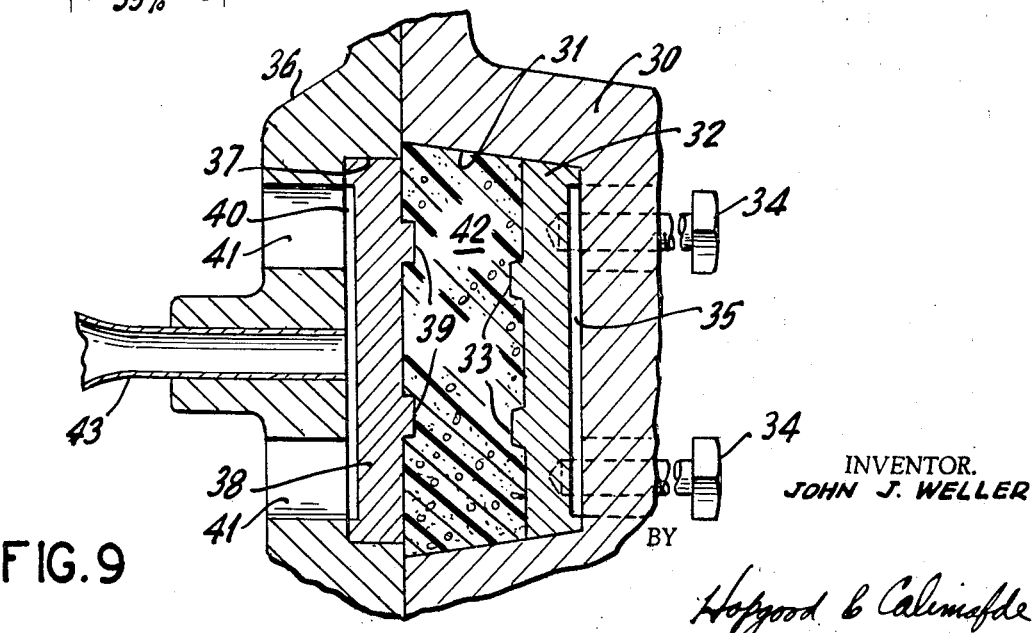
FIG. 9 depicts a fragment of a mold showing a mold cavity for molding foam plastic, it being understood that a complete mold will have a plurality of interconnected mold cavities.
Figure 10:
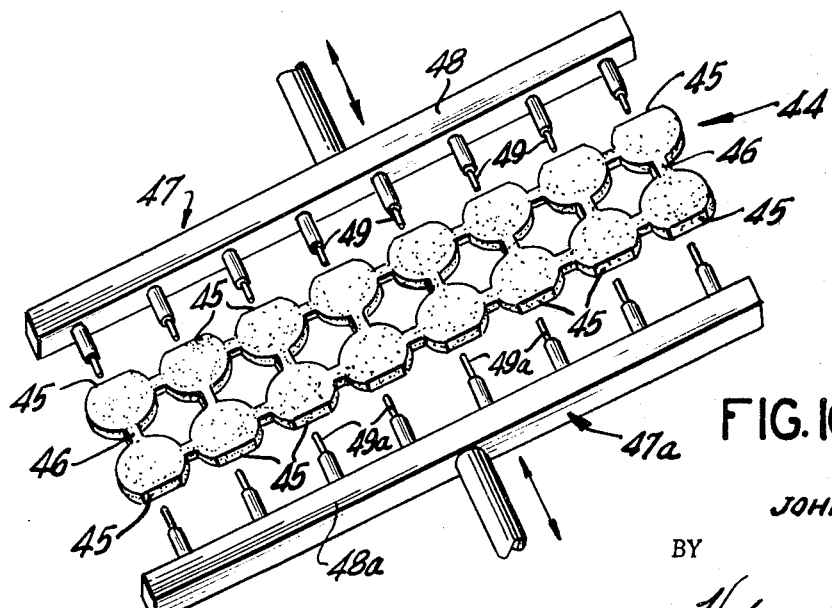
FIG. 10 shows a gang of interconnected molded foam plastic medallions in position for a heat-piercing operation for providing apertures for receiving the end of a radio antenna.

In FIG. 9, a fragmented portion of a mold is shown in FIG. 9 depicting the configuration of one of a plurality of cavities. The fragmented mold comprises a female portion 30 having a cavity 31 which has an insert 32 at the bottom thereof with indicia 33 embossed thereon which is to be reproduced upon one of the faces of the medallion, the insert being held in place by bolts 34. A recess 35 is provided in back of the insert for steam distribution by means not shown, the heat of the steam being employed to heat the plastic polystyrene beads and expand them. The mold is provided with a face plate 36 which also has a cavity 37 containing an insert 38 having indicia 39 embossed thereon. A recess 40 is similarly provided behind insert 38 for receiving steam through channels 41 shown fragmentarily. The cavity of the mold contains a foamed medallion 42. A copper tube 43 is provided for injecting air to assist ejection upon completion of the molding step. By using a mold with a plurality of cavities, a gang of medallions can be molded simultaneously as shown in FIG. 10 and designated by numeral 44. Each of the medallions is provided with a flat 45, the medallions being joined to each other via gates 46. Flats 45 are advantageous in that they provide means for indexing the ganged medallions using a fixture or jig now shown. The ganged medallions are positioned between a pair of hole-piercing tools 47 and 47a comprising frames 48 and 48a having a plurality of pins 49 and 49a extending transversely therefrom. The pins are electrically heated to, for example, 300° F. by means not shown. By moving the frames in the direction of the arrows, the heated pins enter the cross sectional thickness of the medallions and burn through the foam plastic to form the apertures which are displaced off center in accordance with the relationship discussed with regard to FIGS. 3 to 7.

After the holes or apertures are burned in, the grid or gang of medallions are placed on a jig and the medallions are severed apart by using hot wire to cut through the gates.

As is apparent from the foregoing, the invention also provides a method for producing the medallion comprising providing a mold havng a female portion defining at least one cavity therein and an attachable face plate therefor, placing an embossed insert in said cavity, said embossed insert having indicia for molding into said medallion, attaching said face plate to said female portion, feeding foamable plastic in said mold, causing said plastic to foam and set in said mold, and removing the molded medallion from said mold.

The term "foam plastic" used herein is meant to include any method of producing low density plastic moldings, including artificial and natural rubber. Densities of such molded plastic may range from 1 to 40 lbs. per cubic foot and, more desirably, from 1 to 6 lbs. per cubic foot. I find it advantageous to produce the medallion from expanded polystyrene.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. The combination of a supporting member and a substantially flat geometrically configured emblematic article made of yieldable, resilient material having a front and back face of substantially the same area and leading and trailing edges, and an aperture into which said supporting member is fitted, said supporting member having a spherical terminus at its fitted end, the aperture extending into and ending as a blind hole within the cross-sectional thickness of said emblematic article from one edge thereof, the axis of the supporting member within said aperture being disposed intermediate the leading edge and vertical axis of the center of gravity of the emblematic article, the spherical terminus being press-fitted and locked in at the blind end of the aperture by virtue of the resilience of the material, the distance of the supporting member from the axis of the center of gravity being about 10% to 35% of the effective width of the emblematic article determined by dividing the area of a face of the emblematic article by its height.

2. The combination of claim 1, wherein the emblematic article is made of lightweight plastic.

3. The medallion of claim 2, wherein the plastic is expanded polystyrene.

4. The medallion of claim 3, wherein the expanded polystyrene has a density of about 1 to 6 lbs. per cubic foot.

5. The emblematic article of claim 4, wherein the supporting member is a vehicular radio antenna.

References Cited

UNITED STATES PATENTS

| 571,449 | 11/1896 | Laube | 46—53 |
| 1,196,348 | 8/1916 | Gianini | 40—37.1 |
| 1,555,102 | 9/1925 | Chatfield | 40—37 X |
| 1,728,079 | 9/1929 | Power. | |
| 2,621,441 | 12/1952 | Worden | 40—37.1 |

EUGENE R. CAPOZIO, Primary Examiner

W. J. CONTRERAS, Assistant Examiner

U.S. Cl. X.R.

40—145